US006519555B1

(12) United States Patent
Kelley et al.

(10) Patent No.: US 6,519,555 B1
(45) Date of Patent: Feb. 11, 2003

(54) APPARATUS AND METHOD OF ALLOWING PCI V1.0 DEVICES TO WORK IN PCI V2.0 COMPLIANT SYSTEM

(75) Inventors: Richard Allen Kelley, Apex, NC (US); Danny Marvin Neal, Round Rock, TX (US); Michael Anthony Perez, Cedar Park, TX (US); Paul Gordon Robertson, Austin, TX (US); Padmavathy Tamirisa, Austin, TX (US); John Daniel Upton, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 839 days.

(21) Appl. No.: 08/723,174

(22) Filed: Sep. 30, 1996

(51) Int. Cl.⁷ .............................. G06F 17/50; G06G 7/62
(52) U.S. Cl. ........................................... 703/13; 703/15
(58) Field of Search ........................ 395/500, 306–311; 706/13, 15

(56) References Cited

U.S. PATENT DOCUMENTS

| | | | |
|---|---|---|---|
| 4,885,482 A | 12/1989 | Sharp et al. | 307/465 |
| 5,317,715 A | 5/1994 | Johnson et al. | 395/425 |
| 5,426,739 A | 6/1995 | Lin et al. | 364/240 |
| 5,440,755 A | 8/1995 | Harwer et al. | 395/800 |
| 5,446,869 A | 8/1995 | Padgett et al. | 395/500 |
| 5,455,915 A | 10/1995 | Coke | 395/325 |
| 5,471,585 A | 11/1995 | Barakat et al. | 395/308 |
| 5,485,585 A | 1/1996 | Huynh et al. | 395/311 |
| 5,499,346 A | 3/1996 | Amini et al. | 395/308 |
| 5,564,026 A * | 10/1996 | Amini et al. | 395/308 |
| 5,564,027 A * | 10/1996 | Bui et al. | 395/309 |
| 5,577,213 A * | 11/1996 | Avery et al. | 395/309 |
| 5,608,877 A * | 3/1997 | Sung et al. | 395/309 |
| 5,632,021 A * | 5/1997 | Jennings | 395/309 |
| 5,644,734 A * | 7/1997 | Hong | 395/309 |
| 5,652,848 A * | 7/1997 | Bui et al. | 395/309 |
| 5,664,124 A * | 9/1997 | Katz et al. | 395/309 |
| 5,724,528 A * | 3/1998 | Kulik et al. | 395/308 |
| 5,737,524 A * | 4/1998 | Cohen et al. | 395/281 |
| 5,737,765 A * | 4/1998 | Shigeeda | 395/310 |

FOREIGN PATENT DOCUMENTS

| | | |
|---|---|---|
| EP | 0658852 A2 | 6/1995 |
| EP | 0689146 A1 | 12/1995 |
| GB | 2290640 A | 1/1996 |
| JP | 3-160546 | 7/1991 |
| WO | 92/06427 | 4/1992 |
| WO | 94/11802 | 5/1994 |

OTHER PUBLICATIONS

*PCI Local Bus*, "PCI Local Bus Specification", Production Version, Revision 2.0, apr. 30, 1993, pp. 55–64.
"PCI System Architecture", Shanley & Anderson, Addison-–Wesley, 11/95, XP002051391, pp. 381–386 and 429–435.
"An Engineering Approach to Digital Design", W. I. Fletcher, 1980, Prentice–Hall, XP002051392, pp. 236–238.
"PCI Type 1 Configuration in Type 0 Only Systems", IBM Technical Disclosure Bullertin, vol. 38, No. 12, 12/95, pp. 485–489.

* cited by examiner

*Primary Examiner*—Hugh M. Jones
(74) *Attorney, Agent, or Firm*—Volel Emile; Leslie A. Van Leeuwen

(57) ABSTRACT

The invention provides an apparatus and method of allowing a device to respond to a configuration query only if it is the true target of the query. In one embodiment of the invention, logic gates having two inputs are provided. The first input of the logic gates is connected to the signal of a bridge that selects a device when the address of the signal is referenced in the configuration query. The second input of the logic gate receives a signal indicating whether the local bus or the subordinate bus is being configured and the output of the logic gate is used to enable the device. In a second embodiment, certain signals designated to indicate the selection of a bus are used to enable devices to respond to configuration queries.

17 Claims, 3 Drawing Sheets

FIG. 2A

| Bits | Field |
|---|---|
| 0 | 0 |
| 1 | 0 |
| 2–7 | REGISTER NUMBER |
| 8–10 | FUNCTION NUMBER |
| 11–31 | RESERVED |

FIG. 2B

| Bits | Field |
|---|---|
| 0 | 1 |
| 1 | 0 |
| 2–7 | REGISTER NUMBER |
| 8–10 | FUNCTION NUMBER |
| 11–15 | DEVICE NUMBER |
| 16–23 | BUS NUMBER |
| 24–31 | RESERVED |

APPARATUS AND METHOD OF ALLOWING PCI V1.0 DEVICES TO WORK IN PCI V2.0 COMPLIANT SYSTEM

BACKGROUND OF THE INVENTION

1. Field of the Invention

The present invention relates generally to peripheral component interconnect (PCI) systems and more particularly, to the utilization of devices designed to the PCI version 1.0 specifications in PCI versions 2.0 and 2.1 systems.

2. Description of the Related Art

Computer systems typically include more than one bus. Attached to each bus are devices which communicate locally with each other over the bus. Some of the buses include system buses and peripheral buses. System buses typically have host central processors and main memory devices attached to them whereas peripheral buses have peripheral devices such as graphics adapters, communication adapters, network adapters, compact disk, floppy disk, hard disk drives etc. attached to them. Various types of peripheral buses are available. However, one type of such bus that is becoming widely used in the industry is the PCI bus. PCI buses are capable of performing significant data transfer in a relatively short period of time (i.e., up to 132 megabytes of data per second).

Specifications for the PCI bus are now in their third version. The architecture of a PCI bus designed in accordance with the first version of the specifications of the PCI bus (or PCI v1.0) only allowed for four expansion slots in a computer system. An expansion slot permits the attachment of a peripheral device to the system. PCI buses designed in accordance with PCI v2.0 specifications, however, allow for many more than four expansion slots. The provision of the additional expansion slots is facilitated using PCI-PCI bus bridges. Each PCI-PCI bus bridge contains a bus. Each bus is able to accommodate four additional expansion slots. Hence, the more PCI-PCI bridges there are, the more PCI buses in the computer system and thus, the more peripheral devices can be accommodated by the system.

The PCI v2.0 specifications mandated that PCI v2.0 systems be backward compatible to PCI v1.0 systems. Thus, peripheral devices designed to the PCI v1.0 specifications can be attached to PCI v2.0 buses. However, the use of PCI v1.0 devices in PCI v2.0 systems presents certain problems when PCI-PCI bridges are used. For example, on power on or after being reset, a computer system has to first configure itself. This usually entails querying each device connected to each PCI bus for its identification and functionality. PCI-PCI bridges, which are connected onto PCI buses, are queried along with the other devices on the buses. PCI v2.0 devices respond to a configuration query if the bus to which they are attached is being configured while their ID select lines are driven. PCI v1.0 devices, on the other hand, respond to a query so long as their ID select lines are driven. As will be discussed later, there are instances when a PCI-PCI bridge is queried while the ID select of a device on the bus to which the bridge is attached is also driven. When this occurs, if the device is a PCI v1.0 device, both the device and the PCI-PCI bridge will respond to the query. As a result, the system may crash.

Thus, there is a need in the art for an apparatus and method that allow PCI v1.0 devices to respond to configuration queries only if they are true targets of the queries.

SUMMARY OF THE INVENTION

The need in the art is addressed by the present invention. In a first implementation of the invention, a logical gate is used between an expansion slot and a bus bridge to select a device when the device is the true target of a configuration query.

In another implementation of the invention, an address data line designated to indicate the selection of a bus to be configured is used instead to select a device when the device is the true target of a configuration query.

BRIEF DESCRIPTION OF THE DRAWING

FIG. 2a is a configuration protocol for a target device attached to a local PCI bus.

FIG. 2b is a configuration protocol for a target device attached to a subordinate PCI bus.

DESCRIPTION OF THE INVENTION

Figure 1:
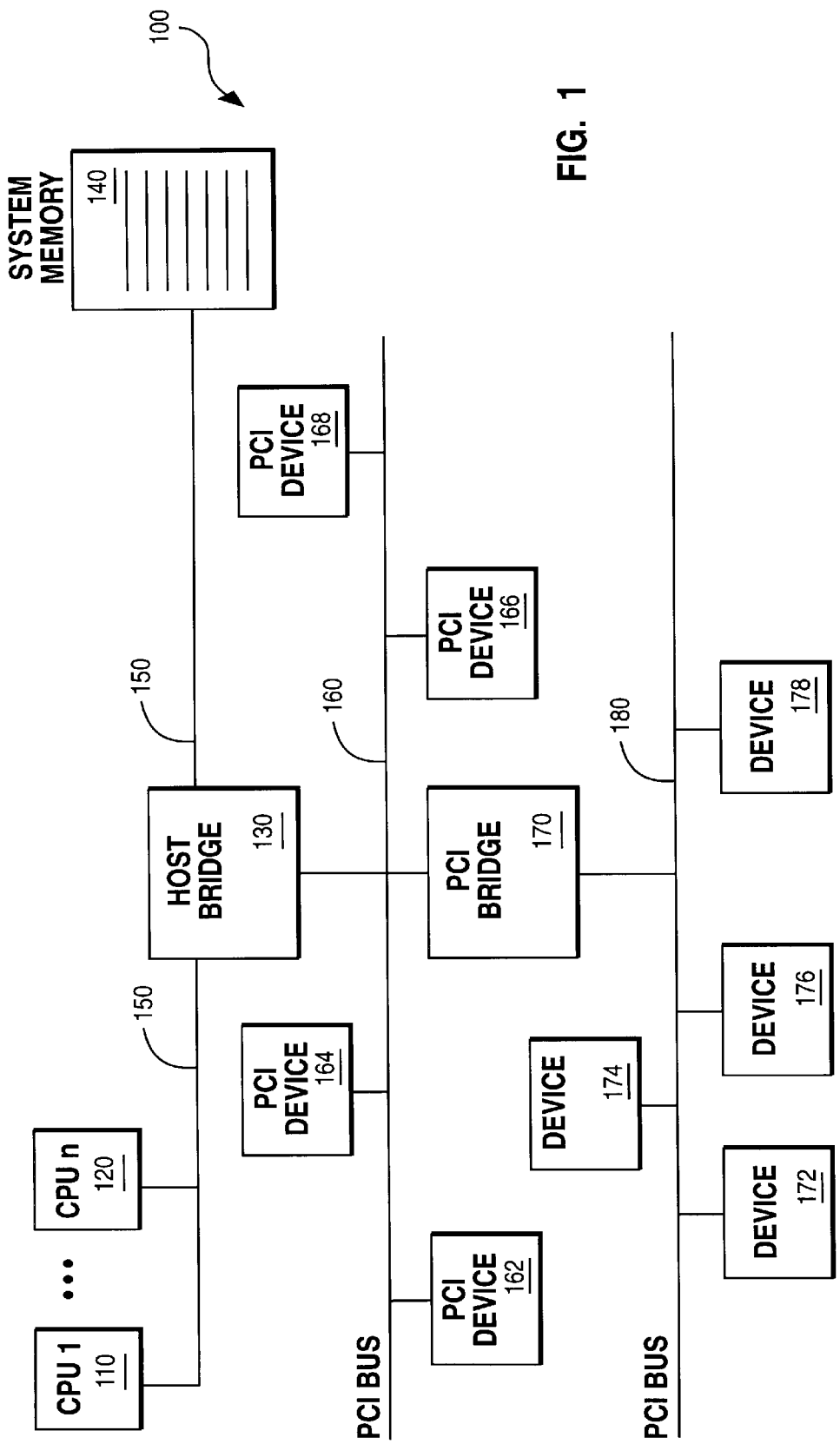
FIG. 1 is a block diagram of a computer system 100 employed in a preferred embodiment of the invention.

FIG. 1 is a block diagram of a computer system 100 employed in a preferred embodiment of the invention. Such computer may take the form of a workstation such as the RS/6000 systems marketed by the IBM Corporation, although the invention is not intended to be so limited and is equally applicable to essentially any computer system having a PCI-PCI bridge.

Still referring to FIG. 1, the computer system 100 contains a plurality of central processing units (CPU) 110 and 120 connected to a system memory 140 through a host bridge 130 on system bus 150. The host bridge is connected to a PCI bus 160 having PCI devices 162–168 attached thereto. Also attached to the PCI bus 160 is a PCI bridge 170 which is connected to PCI bus 180. Attached to the PCI bus 180 are devices 172–178. The PCI devices may comprise any of the following: graphics adapters, communication adapters, network adapters, compact disk, floppy disk, hard disk drives etc. As is well known in the art, the system bus 150 and the PCI buses 160 and 180 use different protocols. The devices attached to the system bus can communicate to the devices on the PCI buses using bridges which act as translators. For example, the CPU 110 attached to the local bus 150 may access data in a compact disk drive attached to the PCI bus 160 by going through the host bridge 130.

As stated earlier, upon power on or on reset, the computer system will configure itself by having one of the CPUs 110 and 120 querying all the devices attached to the system for their identification and functionality. To support hierarchical PCI buses, two types of configuration accesses are used. FIG. 2a depicts a type 0 configuration access and FIG. 2b depicts a type 1 configuration access. Type 0 configuration accesses are used when a device attached to a PCI bus that is being configured (i.e., a local bus) is the target of a configuration query and type 1 configuration accesses are used when a PCI bridge or a device attached to a non-local bus (i.e., a subordinate bus) is the target of the configuration query. Both types of configuration accesses are communicated over address data lines 0–31 (or AD[31::00]). The type of configuration accesses is determined by the value of address data lines 0 and 1 (or AD[1::0]). If AD[1::0] are 00 then the configuration access is a type 0 access and if the AD[1::0] are 01 the configuration access is a type 1 access. (Note that address data line 0 has a different value from a type 0 to a type 1 access whereas address data line 1 has the same value for both types.) AS shown in FIGS. 2a and 2b, register numbers are provided on AD[07::02] data lines and function numbers on AD[10::08] data lines. AD[31::11] of FIG. 2a are reserved address data lines. However, AD[15::11] of FIG. 2b are used to provide a device number, AD[23::16] are used to indicate a bus number and AD[24::31] are reserved.

A register number is an encoded value used to index a double word (DWORD) in the configuration space of the intended data whereas a function number is an encoded value used to select one of eight possible functions on a device. The register number and the function number are not relevant in the present invention and thus are not further discussed. The device number is an encoded value used to select 1 of 32 devices on a given bus and the bus number is an encoded value used to select 1 of 256 buses in a system. As part of the system initialization, each bus is assigned a bus number.

Figure 3:
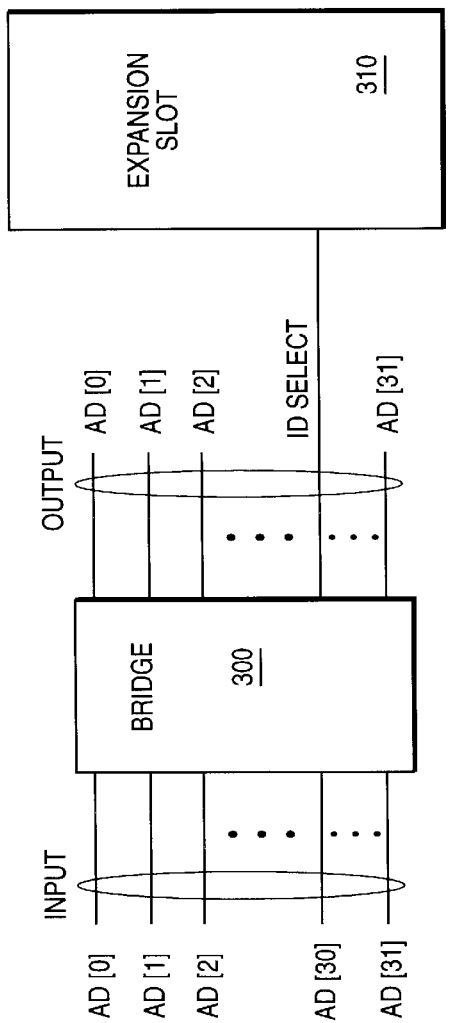
FIG. 3 depicts a bridge having 32 address data input lines and 32 address data output lines.

FIG. 3 represents a bridge having its input and output connected to address data lines AD[31::0]. FIG. 3 includes a bridge connected to an expansion slot 310. Normally, a bridge will receive a type 1 configuration access at its input AD[31::0] lines. If a local bus is being configured (as indicated by the bus number of the type 1 access), then the bridge will translate the type 1 access to a type 0 access. Thus, its AD[1::0] output lines will have a 00 value instead of the 01 value received. If, on the other hand, a subordinate bridge is being configured, then the bridge will not translate the type 1 access (i.e., the type 1 access will be passed downstream as received). The AD[31::00] data lines are connected to a pin out grid array in each of the expansion slots wherein each address data line is connected to a pin in the slot. The ID select of each device is connected, through a pin, to one of the upper 21 address data lines (i.e., AD[31::11]).

Returning to FIG. 1, in operation, as the devices are not connected to the system bus 150, the CPU configuring the system will send the type 1 access to the host bridge 130. Once the host bridge 130 receives the protocol, it checks the encoded data indicating the bus number to find out whether the local PCI bus 160 is selected. If the local PCI bus 160 is selected, then one of the devices connected to the bus is the target of the configuration query. If the local PCI bus 160 is not selected, none of the devices connected to the local PCI bus 160 is selected and the host bridge 130 passes the type 1 configuration access to the PCI bridge 170 downstream. The PCI bridge 170 then checks to see if the subordinate PCI bus 180 is selected. If not, it passes the type 1 configuration access to the next PCI bridge if one exists in the system. This will continue until a PCI bridge having the selected bus number acquires the configuration access cycle. In the present case, since there are only two bridges, the system will select one of the buses connected to the bridges.

If the local bus 160 is selected, the host bridge 130 will translate the type 1 access received from the CPU to a type 0 which will appear at its output AD[31::00]. This translation will include selecting the proper device by decoding the device number from the type 1 access and driving the device's ID select by asserting the correct address data line. If the subordinate PCI bus 180 is selected, the host bridge 130 will pass the type 1 configuration to the PCI bridge 170. The PCI bridge will indicate its acquisition of the type 1 access then translate the type 1 access to a type 0 as described above.

Since the ID selects of the devices are connected each to one of the address data lines AD[31::11], the code indicating the device number or bus number etc. may result in enabling an address data line connected to one of the devices' ID select. If the device is a PCI v1.0 device, it will respond to the type 1 access since, unlike PCI v2.0 devices, PCI v1.0 devices do not ascertain that the configuration access type is 0 before responding to a query. Therefore, both the PCI bridge 170 and the PCI v1.0 device may respond to the query at the same time. When that occurs, the system is likely to crash.

Figure 4:
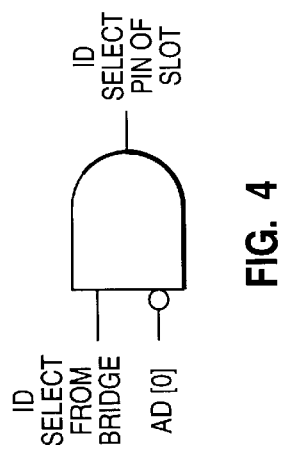
FIG. 4 depicts one of a plurality of AND gates used in the present invention to ascertain that only a true target device responds to a configuration query.
Figure 5:
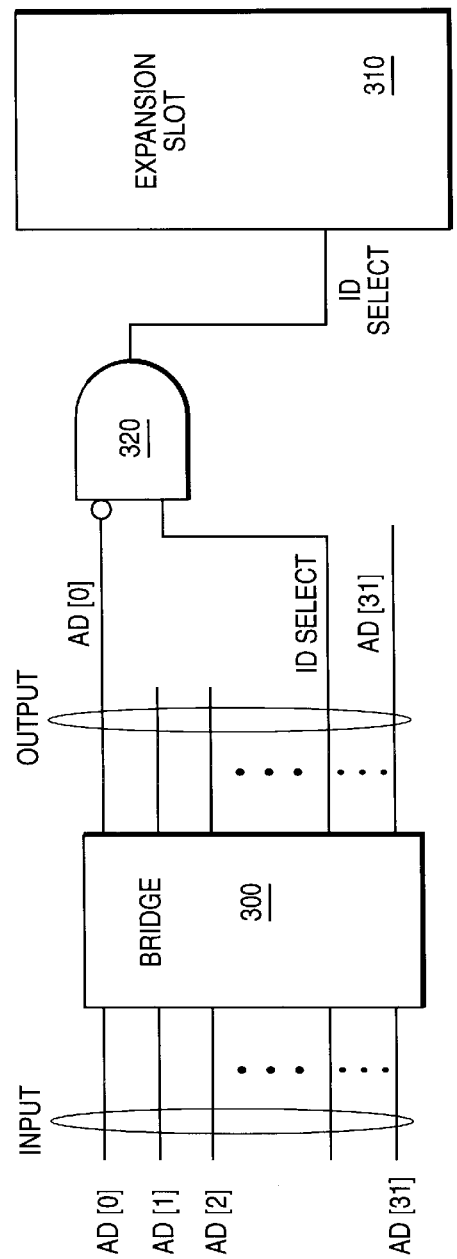
FIG. 5 depicts the AND gate of FIG. 4 as implemented in the present invention.

FIG. 4 depicts one of a plurality of AND gates used in the present invention to ensure that only a true target device responds to a configuration query. The AND gate may be located between a bridge and an expansion slot as shown in FIG. 5 and has two inputs. The first input is connected to the address data line to which the ID select of the device was connected. The second input receives the inverse signal of AD[0] (i.e. address data line 0) and the output of the AND gate is connected to the ID select of the device. Thus, when a PCI device is connected to a local bus and it is a true target of a configuration query, its ID select will be asserted. That is, the first input of the AND gate will be a logical "1". The second input will also be a logical "1" since it receives the inverse of the AD[0] address line. Hence, the output of the AND gate will be a logical "1"resulting in the ID select of the device being asserted. If, however, the access is a type 1 access, the inverse of the signal on the AD[0] address line will be a logical "0". Thus, the ID select of the device will not be asserted as the output of the AND gate will be a logical "0". Consequently, only the true target device of a configuration query will respond to the query when the present invention is used.

The following describes another implementation of the invention. As mentioned earlier, AD[23::16] are used to provide the bus number in a type 1 configuration cycle. With the use of these address data lines, a system can select up to 256 buses. If data lines 20–23 were to be used for other purposes, data lines 16–19 will still allow 16 buses to be used in a system, a number of buses which is more than ample for many present computer systems. Accordingly, address data lines 20–23 may each be connected to an ID select pin of each of the four expansion slots in a PCI bus. Referring back to FIG. 1, the ID select of device 162 in slot 1 may be connected to AD[20], for example. Device 164 in slot 2 may have its ID select connected to AD[21] and the ID select of device 166 in slot 3 may be connected to AD[22] whereas the ID select of device 168 in slot 4 may be connected to AD[23]. Note that the same applies to devices 172–178 in expansion slots 1–4 of the subordinate bus 180.

As per the PCI specifications, during system initialization, each device has to inform the system as to which data line its ID select is connected. Hence, when the configuring processor wants to send a configuration query to a particular device on a PCI bus, it encodes the device number that will result in driving the address data line connected to the ID select of the appropriate device. Therefore, when a device on a local bus is selected the bridge will translate the type 1 configuration access it receives to drive the appropriate one of the AD[23::20] lines. This will correspondingly drive the ID select of the selected device thereby enabling the device to respond to the configuration query. When it is a type 1 configuration access, since the number of buses in the system will be equal or less than 16, none of the address lines AD[23::20] will be asserted and thus, the ID select of the devices on the local bus 160 will not be driven. Consequently, no devices on a local bus will respond to a type 1 configuration access.

Although the present invention has been fully described above with reference to specific embodiments, other alternative embodiments will be apparent to those of ordinary skill in the art. For example, any other logic gates may be used instead of the AND gates. Furthermore, the invention may be implemented in either a motherboard or an adapter card. In addition, the ID selects of the devices may be driven by any other sources so long as those sources enable a device only when the device is the true target of a configuration query. Therefore, the above description should not be taken as limiting the scope of the present invention which is defined by the appended claims.

What is claimed is:

1. An apparatus for selecting a device when said device is a target of a configuration query comprising:
   at least a bus bridge having a slot for attaching a device; and
   at least a logic gate connected between said bridge and said slot for selecting said device when said device is a true target of said configuration query.

2. The apparatus of claim 1 wherein said logic gate is an AND gate.

3. The apparatus of claim 2 wherein said slot is attached to said bus bridge by at least a first address data line, said first address data line for enabling said device to respond to said configuration query.

4. The apparatus of claim 3 wherein said AND gate has a first and a second input and an output, said first input being connected to said first address data line and said second input being connected to a second address data line, said second address data line indicating whether a bus attached to said bridge is being configured, said output of said first AND gate for enabling said device.

5. An apparatus for selecting a device when said device is a target of a configuration query comprising:
   at least a bus bridge having a slot for attaching a device, said bus bridge driving 32 address data lines wherein one of said 32 address data lines is used to enable said device only when said device is a target of said configuration query, said one of said 32 address data lines being a data line reserved to indicate a selected bus.

6. A method of selecting a device when said device is a target of a configuration query comprising the steps of:
   attaching a device in a slot of a bus bridge; and
   connecting a logic gate between said bridle and said slot, said logic gate for selecting said device when said device is a target of said configuration query.

7. The method of claim 6 wherein said logic gate is an AND gate.

8. The method of claim 7 wherein said slot is attached to said bus bridge by at least a first address data line, said first address data line for enabling said device to respond to said configuration query.

9. The method of claim 8 wherein said AND gate has a first and a second input and an output, said first input being connected to said first address data line and said second input being connected to a second address data line, said second address data line indicating whether a bus attached to said bridge is being configured, said output of said first AND gate for enabling said device.

10. A method of selecting a device when said device is a target of a configuration query comprising the step of:
    attaching said device in a slot connected to a bus bridge, said bus bridge driving 32 address data lines wherein one of said 32 address data lines is used to enable said device only when said device is a target of said configuration query, said one of said data lines being reserved to indicate a selected bus.

11. A computer system comprising:
    at least one processor, said processor being able to configure said system by sending configuration queries to devices attached to said system; and
    means for selecting a device when said device is a target of a configuration query said selecting means including:
    at least a bus bridge having a slot for attaching said device; and
    at least a logic gate connected between said bridge and said slot for selecting said device when said device is a target of said configuration query.

12. The computer system of claim 11 wherein said logic gate is an AND gate.

13. The computer system of claim 12 wherein said slot is attached to said bus bridge by at least a first address data line, said first address data line for enabling said device to respond to said configuration query.

14. The computer system of claim 13 wherein said AND gate has a first and a second input and an output, said first input being connected to said first address data line and said second input being connected to a second address data line, said second address data line indicating whether a bus attached to said bridge is being configured, said output of said first AND gate for enabling said device.

15. A computer system comprising:
    at least one processor, said processor being able to configure said system by sending configuration queries to devices attached to said system; and
    means for selecting a device when said device is a target of a configuration query said selecting means including:
    at least a bus bridge having a slot for attaching a device, said bus bridge driving 32 address data lines wherein one of said 32 address data lines is used to enable said device only when said device is a target of said configuration query, said one of said data lines being one of a plurality of reserved a selected bridge.

16. An apparatus for selecting a peripheral component interconnect (PCI) v1.0 compliant device when said device is operating in a v2.0 or higher PCI compliant system and is a target of a configuration query, said apparatus comprising:
    at least one bus bridge having a slot for attaching said device, said device having an IDselect; and
    at least one logic gate having at least two inputs connected to said slot and an output connected to said device for allowing said device to be selected when said device is a true target of said configuration query.

17. The apparatus of claim 16 wherein said output is connected to said Idselect of said device.

* * * * *